(12) United States Patent
Wang et al.

(10) Patent No.: US 9,275,438 B2
(45) Date of Patent: Mar. 1, 2016

(54) BILATERAL DENOISING FOR DIGITAL CAMERA IMAGES

(71) Applicant: Futurewei Technologies, Inc., Plano, TX (US)

(72) Inventors: Bo Wang, College Station, TX (US); Zixiang Xiong, Houston, TX (US); Dongqing Zhang, Plainsboro, NJ (US); Hong Heather Yu, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 41 days.

(21) Appl. No.: 14/226,162

(22) Filed: Mar. 26, 2014

(65) Prior Publication Data

US 2014/0293096 A1    Oct. 2, 2014

Related U.S. Application Data

(60) Provisional application No. 61/805,280, filed on Mar. 26, 2013.

(51) Int. Cl.
*H04N 5/217* (2011.01)
*G06T 5/00* (2006.01)
*G06T 5/20* (2006.01)

(52) U.S. Cl.
CPC . *G06T 5/002* (2013.01); *G06T 5/20* (2013.01); *H04N 5/217* (2013.01); *G06T 2207/20012* (2013.01); *G06T 2207/20028* (2013.01)

(58) Field of Classification Search
None
See application file for complete search history.

(56) References Cited

U.S. PATENT DOCUMENTS

2013/0321700 A1* 12/2013 Cote et al. ............. 348/453

OTHER PUBLICATIONS

Tomasi, C., et al., "Bilateral Filtering for Gray and Color Images," 1998 IEEE International Conference on Computer Vision, Bombay, India, 8 pgs.
Hirakawa, K., et al., "Joint Demosaicing and Denoising," IEEE Trans, 2006, vol. 15, No. 8, 4 pgs.

\* cited by examiner

*Primary Examiner* — Twyler Haskins
*Assistant Examiner* — Angel L Garces-Rivera
(74) *Attorney, Agent, or Firm* — Conley Rose, P.C.; Grant Rodolph; Adam J. Stegge

(57) ABSTRACT

An apparatus comprising one or more processors configured to receive a digital image comprising a current pixel and a plurality of nearby pixels, determine a pixel intensity of the current pixel, wherein the pixel intensity comprises a noise component, and reduce the noise component by applying a bilateral filter as a combination of a domain filter and a range filter on the current pixel, wherein the domain filter is dependent on the pixel intensity and geometric closeness between the current pixel and the nearby pixels, and wherein the range filter is dependent on the pixel intensity and photometric similarity between the current pixel and the nearby pixels.

19 Claims, 4 Drawing Sheets

BILATERAL DENOISING FOR DIGITAL CAMERA IMAGES

CROSS-REFERENCE TO RELATED APPLICATIONS

The present application claims priority to U.S. Provisional Patent Application No. 61/805,280 filed Mar. 26, 2013 by Bo Wang et al. and entitled "Denoising For Digital Camera Image In Low-Light Conditions", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Random noise captured by digital cameras may degrade the quality and authenticity of resulting digital images. For example, when a digital camera capture images in low-light conditions, an image sensor on the digital camera may receive insufficient light, which may result in an under-exposed image. The under-exposed image may appear faded and blurry due to noises in image pixels. Furthermore, inexpensive camera sensors found in some mobile electronic devices such as smartphones and tablets may exacerbate the problem by introducing additional noise. Thus, denoising filters configured to reduce or remove noises from images may help improve image quality.

SUMMARY

In one embodiment, the disclosure includes an apparatus comprising one or more processors configured to receive a digital image comprising a current pixel and a plurality of nearby pixels, determine a pixel intensity of the current pixel, wherein the pixel intensity comprises a noise component, and reduce the noise component by applying a bilateral filter as a combination of a domain filter and a range filter on the current pixel, wherein the domain filter is dependent on the pixel intensity and geometric closeness between the current pixel and the nearby pixels, and wherein the range filter is dependent on the pixel intensity and photometric similarity between the current pixel and the nearby pixels.

In another embodiment, the disclosure includes a method for image filtering comprising receiving a digital image comprising a current pixel, acquiring an intensity of the current pixel, and filtering the acquired intensity of the current pixel to generate a filtered intensity, wherein filtering the acquired intensity comprises domain filtering and range filtering, both of which are based at least in part on the acquired intensity.

In yet another embodiment, the disclosure includes a computer program product comprising computer executable instructions stored on a non-transitory computer readable medium such that when executed by a processor cause a mobile electronic device to obtain a digital image comprising a plurality of pixels, wherein each pixel comprises a noise component that is dependent upon an intensity of the pixel, denoise the digital image by adaptively applying a domain filter and a range filter on each pixel, wherein the adaptive application of the domain filter on a pixel in the digital image is based at least in part on the intensity of the pixel, and display the denoised imaged on a display of the mobile electronic device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments for improving noise reduction in digital images by using a bilateral filter that takes intensity-dependent noises into account. In an embodiment, a digital image may be generated or received by an electronic device (e.g., a smartphone). For a current pixel in the digital image, the electronic device may determine a pixel intensity that comprises a noise component, and then reduce the noise component by applying a bilateral filter. The bilateral filter combines a domain filter and a range filter, both of which may be configured to be dependent on pixel intensity. If the domain and range filters are Gaussian filters, for example, the Gaussian variances and filter sizes may be adapted based on the pixel intensity. The bilateral filters disclosed herein may preserve edges between image pixels while reducing or removing noises more effectively than conventional bilateral filters.

Figure 1:
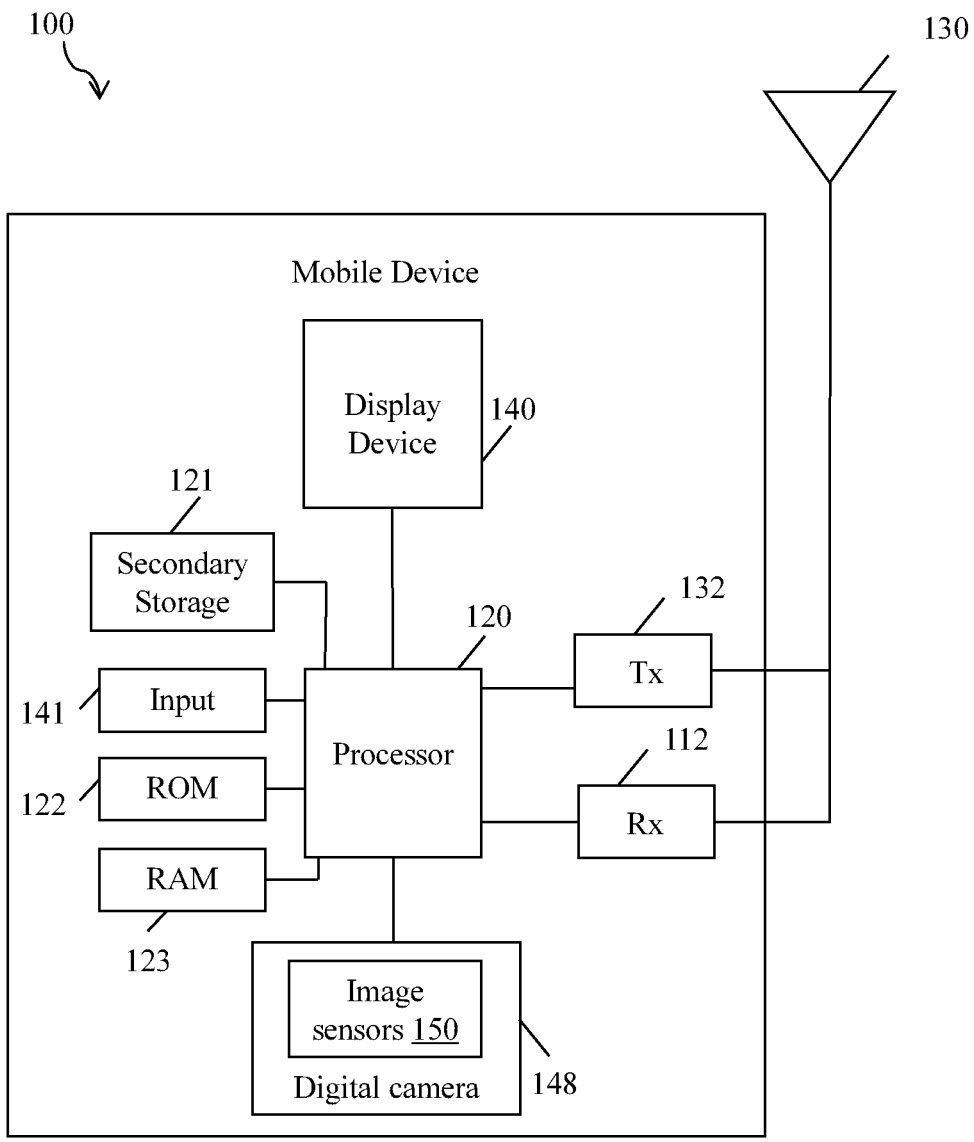
FIG. 1 is a schematic diagram of an embodiment of a mobile device.

Embodiments disclosed herein may be implemented on any suitable electronic device or computer system, such as a mobile device, that is capable of processing digital images. FIG. 1 illustrates an embodiment of a mobile device 100. The mobile device 100 may comprise a two-way wireless communication device having voice and data communication capabilities. In some aspects, voice communication capabilities are optional. The mobile device 100 generally has the capability to communicate with other computer systems on the Internet. Depending on the exact functionality provided, the mobile device 100 may be referred to as a data messaging device, a two-way pager, a wireless e-mail device, a cellular telephone with data messaging capabilities, a wireless Internet appliance, a wireless device, a smartphone, a mobile device, or a data communication device, as examples.

The mobile device 100 may comprise a processor 120 (e.g., a central processor unit (CPU)) that is in communication with memory devices including secondary storage 121, read only memory (ROM) 122, and random access memory (RAM) 123. The processor 120 may be implemented as one or more CPU chips, one or more cores (e.g., a multi-core processor), or may be part of one or more application specific integrated circuits (ASICs) and/or digital signal processors (DSPs). The processor 120 may be configured to implement any of the schemes described herein, and may be implemented using hardware, software, firmware, or combinations thereof.

The secondary storage 121 may be comprised of one or more solid state drives, disk drives, and/or other memory types and is used for non-volatile storage of data and as an over-flow data storage device if RAM 123 is not large enough to hold all working data. Secondary storage 121 may be used to store programs that are loaded into RAM 123 when such programs are selected for execution. The ROM 122 may be used to store instructions and perhaps data that are read during program execution. ROM 122 may be a non-volatile memory device and may have a small memory capacity relative to the larger memory capacity of secondary storage 121. The RAM 123 may be used to store volatile data and perhaps to store instructions. Access to both ROM 122 and RAM 123 may be faster than to secondary storage 121.

The mobile device 100 may communicate data (e.g., packets) wirelessly with a network. As such, the mobile device 100 may comprise a receiver (Rx) 112, which may be configured for receiving data (e.g. Internet Protocol (IP) packets or Ethernet frames) from other components. The receiver 112 may be coupled to the processor 120, which may be configured to process the data and determine to which components the data is to be sent. The mobile device 100 may also comprise a transmitter (Tx) 132 coupled to the processor 120 and configured for transmitting data (e.g. the IP packets or Ethernet frames) to other components. The receiver 112 and transmitter 132 may be coupled to an antenna 130, which may be configured to receive and transmit wireless radio frequency (RF) signals.

The mobile device 100 may also comprise a display device 140 coupled to the processor 120, for displaying output thereof to a user. The mobile device 100 and the display device 140 may be configured to accept a blended image, as discussed below, and display it to a user. The display device 140 may comprise a Color Super Twisted Nematic (CSTN) display, a thin film transistor (TFT) display, a thin film diode (TFD) display, an organic light-emitting diode (OLED) display, an active-matrix organic light-emitting diode (LED) display, or any other display screen. The display device 140 may display in color or monochrome and may be equipped with a touch sensor based on resistive and/or capacitive technologies. The mobile device 100 may further comprise an input device 141 coupled to the processor 120, which may allow the user to input commands to the mobile device 100. In the case that the display device 140 comprises a touch sensor, the display device 140 may also be considered the input device 141. In addition to and/or in the alternative, an input device 141 may comprise a mouse, trackball, built-in keyboard, external keyboard, and/or any other device that a user may employ to interact with the mobile device 100.

The mobile device 100 may further comprise a digital camera 148 coupled to the processor 120 and configured to capture images or videos. In an embodiment, the digital camera 148 may comprise one or more image sensors 150. For example, the image sensors 150 may be complementary metal-oxide semiconductor (CMOS) or charge-coupled device (CDD) image sensors that generate digital images and/or digital videos, and then send digital images to the processor 120. The mobile device 100 may comprise other types of sensors, which may detect conditions in and around the mobile device 100. It should be understood that embodiments for image filtering disclosed herein does not require a digital camera, so the mobile device 100 (or other types of device or system) may not need to have a digital camera 148 or image sensors 150. For example, the digital images may be received by the mobile device 100 from another device or from a network (e.g., the Internet) for processing by the processor 120.

Figure 2:
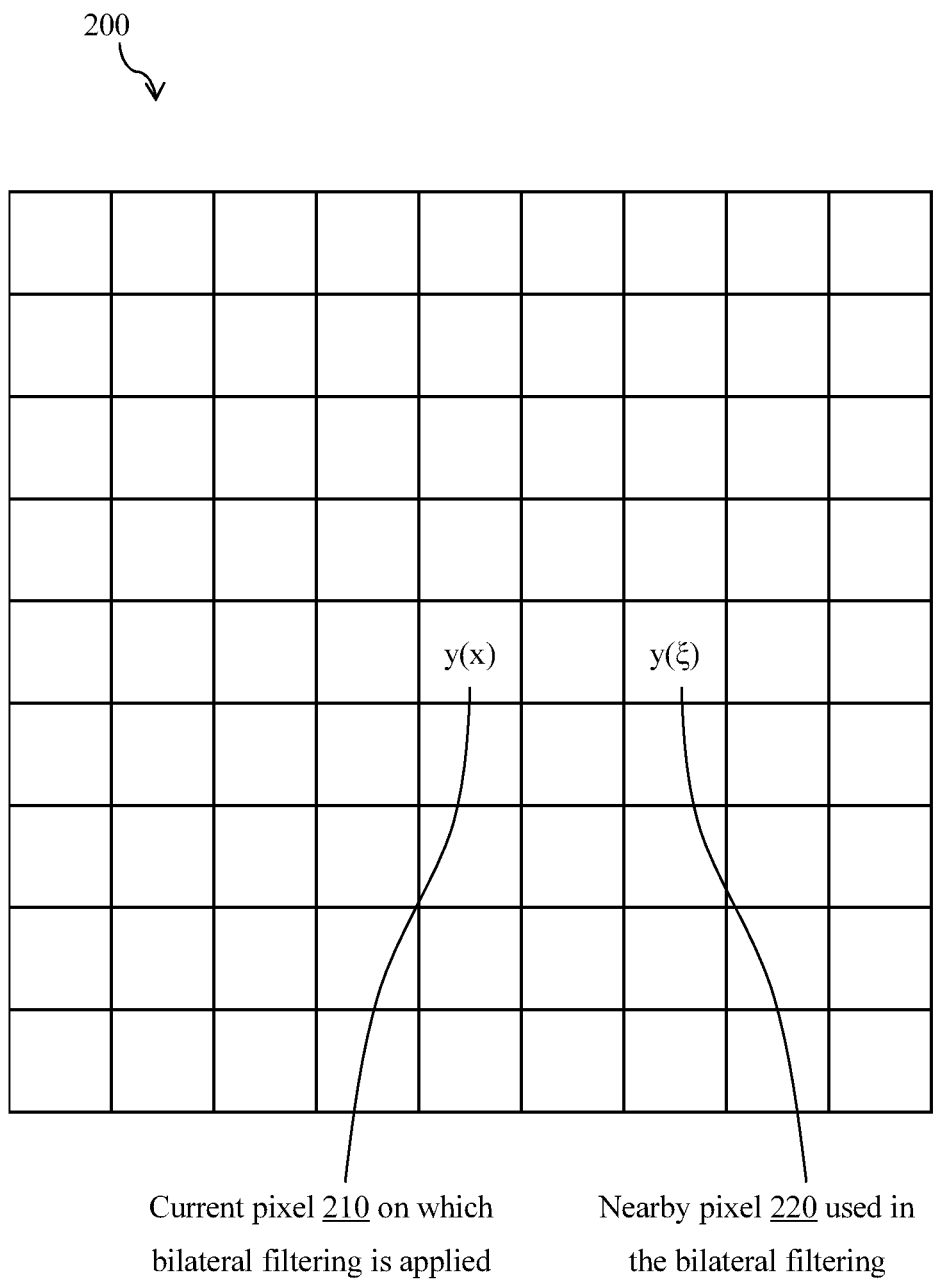
FIG. 2 is a schematic diagram of an embodiment of a digital image.

FIG. 2 illustrates an embodiment of a digital image 200, which may be generated by one or more image sensors (e.g., the image sensors 150) and received by one or more processors (e.g., the processor 120). The image 200 comprises a plurality of pixels at different locations, and each pixel may comprise a pixel intensity. To improve image quality, pixels in the image 200 may be denoised, that is, to reduce or remove noises by applying bilateral filtering. Filtering may be applied pixel-by-pixel or block-by-block, depending on the implementation. For example, for a current pixel 210 located at a certain location (location index denoted as x), a bilateral filter may be applied to reduce a noise component in the intensity of the current pixel 210. The bilateral filtering may take account of a plurality of nearby pixels such as a nearby pixel 220 (location index denoted as $\xi$). Depending on the window size of the bilateral filter, any suitable number of nearby pixels may be used. Thus, the term "nearby" or "neighboring" includes pixels directly and indirectly connected to the current pixel 210.

One of ordinary skill in the art will recognize that any suitable color space may be used to express pixel intensities. Examples of color spaces include, but are not limited to, Lab color space, red, green, and blue (RGB) color space, chrominance and luminance (YUV or YPbPr) color space, cyan, magenta, yellow, and key (CMYK) color space, hue, saturation, and value (HSV) color space, and hue, saturation, and brightness (HSB) color space, etc. Further, if a noise filtering implementation is designed for a color space (e.g., RGB) that is different from the color space of an input image (e.g., YUV), a color space conversion may be performed before the noise filtering process. Depending on the color space, a plurality of color components may exist, and each color component may have an intensity value. In the context of a color space, a pixel intensity or the intensity of a pixel disclosed herein may refer to any of the color components, and may refer to one or more of the color components.

Depending on a number of bits used to represent an intensity value, a pixel intensity may have any suitable value. For example, a pixel intensity may have values between about 0-255 when 8 bits are used for a color component. For mathematical derivations, the pixel intensity may be normalized to be between 0 and 1. Thus, an acquired pixel intensity and a filtered pixel intensity may both have a normalized value between 0 and 1.

Some existing denoising filter algorithms may assume that noise signal characteristics are uniform across all pixels in a digital image (e.g. a noise signal is stationary or constant). However, in reality, noise in a digital image may be dependent on pixel intensity. For example, a mathematical model for noise from digital cameras with CMOS or CDD image sensors may be defined by:

$$y(x)=m(x)+(k_0+k_1 m(x))n(x), \qquad (1)$$

where:
y(x) is an acquired sensor value at pixel location x,
m(x) is an ideal sensor value at pixel location x, $k_0$ is a positive scalar parameter dependent on sensor characteristics, $k_1$ is another positive scalar parameter dependent on sensor characteristics, and $n(x) \sim N(0; 1)$ is a standard Gaussian noise signal.

While the mathematical model in equation (1) may be directed to sensor intensity, the tendency of noise in an acquired image may still roughly adhere to a linear relationship. That is, a noise component represented by the term "$(k_0+k_1m(x))n(x)$" may be roughly linear to an intensity of the pixel. As a result, noise intensity increases with pixel intensity.

Several methods may be employed to remove noise signals from digital camera captured images, such as spatial denoising filter algorithms and bilateral denoising filter algorithms. Spatial denoising algorithms, such as Gaussian filtering, may not account for a linear relationship between noise and pixel intensity. Using spatial denoising algorithms alone may suffer from edge blurring problems, e.g., in areas of an image where there is a sudden change in pixel intensity.

Bilateral denoising filters may offer better edge preserving properties compared to spatial filtering alone. In practice, noise signals from a digital camera with a CMOS image sensor may be pixel-intensity dependent. Therefore, bilateral filters may need to be improved to account for a non-stationary noise signal that varies across pixels in a digital image.

A bilateral filter may be an efficient and effective tool to reduce an additive white Gaussian noise in which the variance of random noise is assumed to be a constant. A bilateral denoising filter is an edge-preserving non-linear filter widely employed in image processing and enhancement. A concept underlying bilateral filtering is to measure both geometric closeness and photometric similarity between a neighborhood center pixel (i.e., a current pixel) and neighboring or nearby pixel locations.

A bilateral filter may be considered a combination of a domain filter and a range filter. One of ordinary skill in the art will recognize that the term "domain filter" may be interchangeable with spatial filter, geometric filter, or other similar terms. Likewise, the term "range filter" may be interchangeable with photometric filter, intensity filter, or other similar terms. For example, a bilateral filter may be defined by equation:

$$\hat{y}(x) = k^{-1}(x) \int\int_{-\infty}^{\infty} y(x) c(\xi,x) s(\xi,x) d\xi, \quad (2)$$

where:

$\hat{y}(x)$ is a filtered pixel intensity at pixel location x, $k^{-1}(x)$ is a normalization term as calculated in equation (3), $y(x)$ is an acquired sensor value at pixel location x, $c(\xi,x)$ is a range kernel function, $s(\xi, x)$ is a domain kernel function, and $\xi$ is a variable indicating locations of the nearby pixels.

In equation (2), k(x) is a normalization term that may be defined by the equation:

$$k(x) = \int\int_{-\infty}^{\infty} c(\xi,x) s(\xi,x) d\xi, \quad (3)$$

where:

$c(\xi, x)$ is a range kernel function (measuring geometric closeness between center pixel x and a nearby point $\xi$), and $s(\xi, x)$ is a domain kernel function (measuring photometric closeness between center pixel x and a nearby point $\xi$).

Furthermore, the domain filter and range filter of the bilateral filter may be Gaussian filters or may be based on a Gaussian distribution. In this case, $c(\xi, x)$ may be defined by the equation:

$$c(\xi, x) = e^{-\frac{1}{2}\left(\frac{\|\xi-x\|}{\sigma_d}\right)^2}, \quad (4)$$

where:

$c(\xi, x)$ is a Gaussian range kernel function, x is a center pixel, $\xi$ is a point nearby a center pixel x, and $\sigma_d$ is a geometric spread.

Similarly, $s(\xi, x)$ may be defined by the equation:

$$s(\xi, x) = e^{-\frac{1}{2}\left(\frac{\|y(\xi)-y(x)\|}{\sigma_r}\right)^2}, \quad (5)$$

where:

$s(\xi, x)$ is a Gaussian domain kernel function, $y(\xi)$ is an acquired sensor value at pixel location $\xi$, $y(x)$ is an acquired sensor value at a center pixel location x, and $\sigma_r$ is a photometric spread.

In a conventional bilateral filter, the geometric spread $\sigma_d$ and the photometric spread $\sigma_r$ may be empirical values (e.g., constant values), which may lead to ineffective noise filtering, e.g., under low-light conditions. Disclosed embodiments may improve upon the conventional bilateral filtering by determining the geometric spread $\sigma_d$ and the photometric spread $\sigma_r$ adaptively based on pixel intensity.

In practice, when a digital image is captured or generated, noises may not be uniform across all pixels; instead, the noises may be intensity-dependent. Since a noise component may be dependent upon pixel intensity, picture quality and content fidelity may be achieved if stronger denoising filters are applied to an image area with increased noise components, while weaker denoising filters are applied to an image area with less noise components. Namely, the denoising filters may be adapted to accommodate varying pixel intensities. In practice, e.g., under low-light conditions, such an adaptive filtering scheme may improve image quality. Low-light may be a relative term and may refer to any suitable conditions, e.g., an ambient light condition indoor or at night.

In an embodiment, both the range and domain kernel sizes of a disclosed adaptive, bilateral filter may be tuned in accordance with varying pixel intensity of a current pixel. A disclosed adaptive bilateral filter may be defined by an algorithm that modifies a conventional bilateral filter into a pixel intensity level-dependent form. A disclosed adaptive bilateral filter may offer improved digital images captured by digital cameras, such as those on smartphones with CMOS or CDD image sensors. A disclosed adaptive bilateral filter algorithm may also further preserve the fidelity of the digital images in comparison to conventional bilateral filters. As such, a disclosed adaptive bilateral filter may offer an improved digital image quality. Furthermore, as a disclosed adaptive bilateral filter algorithm may be based on a bilateral filter framework, it may offer better edge preservation than a conventional bilateral filter.

As mentioned above, in a bilateral filter, the photometric spread $\sigma_r$ determines a mixture range of pixel intensity values. In a Gaussian kernel $s(\xi, x)$ a confident pixel intensity range may be within $[y(x)-3\sigma, y(x)+3\sigma]$. That is, a combination of pixel intensity values in this range may estimate a current intensity. In an embodiment, based on a noise model defined by equation (1), a signal-dependent version $\sigma_r$ may be presented as $k_0+k_1m(x)$ which may be approximated by $k_0+k_1y(x)$. Therefore, a range adaptive kernel may become:

$$s_a(\xi, x) = e^{-\frac{1}{2}\left(\frac{\|y(\xi)-y(x)\|}{k_0+k_1 y(x)}\right)^2}, \quad (6)$$

where:

$s_\alpha(\xi, x)$ is an adaptive Gaussian domain kernel function, x is a center pixel, ξ is a point nearby a center pixel x, y(ξ) is the acquired sensor value at pixel location ξ, y(x) is the acquired sensor value at a center pixel location x, $k_0$ is positive scalar parameter dependent on sensor characteristics, and $k_1$ is positive scalar parameter dependent on sensor characteristics.

Since $k_0$ and $k_1$ may be positive numbers that may imply noise increases linearly with pixel intensity, denoising for higher pixel intensities may require choosing a kernel range that may include a greater number of pixels. Also kernel $s_\alpha$ may help retain some of the benefits of conventional bilateral filters, such as higher photometric similarity gains for larger weights in a kernel. Also, a proposed adaptive bilateral filter based on a linear noise model may be effective for pixel intensity values between 0.1-0.9 where the largest intensity value may be 1.0 and the lowest intensity value may be 0. Noise variances for the lowest and highest pixel intensities may be relatively low. Thus, a conventional bilateral filter may not work well under these circumstances due to the constant noise intensity variance assumption.

As the number of pixels falling within a chosen kernel range may affect denoising performance, the variance in pixel intensity values may be accounted for when selecting a domain kernel size. A larger geometric spread $\sigma_d$ may blur more digital image detail by combining values from more distant image pixels. Therefore, within a fixed filter window size, varying $\sigma_d$ may be the equivalent of adjusting a window size for a specific local image pixel. Similarly with a range kernel of a conventional bilateral filter, a lower pixel intensity value may require a lower $\sigma_d$ (i.e. $\sigma_d = \sigma_d$ (y(x)). For an embodiment of a window size (w) for a low-pass domain filter, the largest $\sigma_d$ may not exceed w, and the smallest $\sigma_d$ may not be less than w/2. The relationship between $\sigma_d$ and y(x) may be defined by:

$$\sigma_d(y(x)) = \frac{w}{2}\left(1 + \frac{y(x)-0.1}{0.9-0.1}\right), \quad (7)$$

where:

$\sigma_d$ is a geometric spread, y(x) is the acquired sensor value at a center pixel location x, and w is a window size of the domain filter.

Since this linear relationship may be particularly effective for pixel intensity values between about 0.1-0.9, $\sigma_d$ may be set to w/2 for pixel intensity values less than about 0.1, and may be set to w for pixel intensity values greater than about 0.9. The value w/2 (or any other suitable value) may be a minimal window size corresponding to a minimum noise level.

In an embodiment, the geometric spread, denoted as $\sigma_d(y(x))$, is determined using one of the following equations:

$$\sigma_d(y(x)) = \frac{w}{2}\left(1 + \frac{y(x)-0.1}{0.9-0.1}\right) \quad (8)$$

for y(x) between about 0.1 and about 0.9, $$\sigma_d(y(x)) = \frac{w}{2} \quad (9)$$

for y(x) less than about 0.1, and $$\sigma_d(y(x)) = w \quad (10)$$

for y(x) greater than about 0.9.

Accordingly, the domain adaptive kernel $s_a$ may become:

$$c_a(\xi, x) = e^{-\frac{1}{2}\left(\frac{\|\xi-x\|}{\sigma_d(y(x))}\right)^2}, \quad (11)$$

where:

$c_a(\xi, x)$ is an adaptive Gaussian range kernel function, x is a center pixel, ξ is a point nearby a center pixel x, $\sigma_d$ is a geometric spread, and y(x) is the acquired sensor value at a center pixel location x.

Therefore, an adaptive bilateral filter may be implemented by replacing $\sigma_d$ in equation (4) with $\sigma_d(y(x))$ in equation (8), (9), or (10), and replacing s in equation (5) with $s_a$ in equation (6), respectively.

Equations discussed above may be combined to generate a bilateral filter. If a pixel intensity has a normalized value denoted as y(x), applying the bilateral filter on the current pixel results in a filtered pixel intensity denoted as ŷ(x). In an embodiment, the bilateral filter may be represented by the following equations:

$$\hat{y}(x) = k^{-1}(x)\int\int_{-\infty}^{\infty} y(x)c(\xi, x)s(\xi, x)\,d\xi,$$

$$k(x) = \int\int_{-\infty}^{\infty} c(\xi, x)s(\xi, x)\,d\xi,$$

$$c(\xi, x) = e^{-\frac{1}{2}\left(\frac{\|\xi-x\|}{\sigma_d(y(x))}\right)^2},$$

$$s(\xi, x) = e^{-\frac{1}{2}\left(\frac{\|y(\xi)-y(x)\|}{\sigma_r(y(x))}\right)^2}, \text{ and}$$

$$\sigma_r(y(x)) = k_0 + k_1 y(x),$$

where x is a location of the current pixel,

ξ is a variable indicating locations of the nearby pixels, $k^{-1}(x)$ is a normalization term, c(ξ, x) is a Gaussian range kernel function, s(ξ, x) is a Gaussian domain kernel function, $\sigma_d(y(x))$ is a geometric spread, $\sigma_r(y(x))$ is a photometric spread, y(ξ) is a pixel intensity of a corresponding nearby pixel at location ξ, $k_0$ is a positive scalar parameter dependent on image sensor characteristics, and $k_1$ is another positive scalar parameter dependent on image sensor characteristics.

Figure 3:
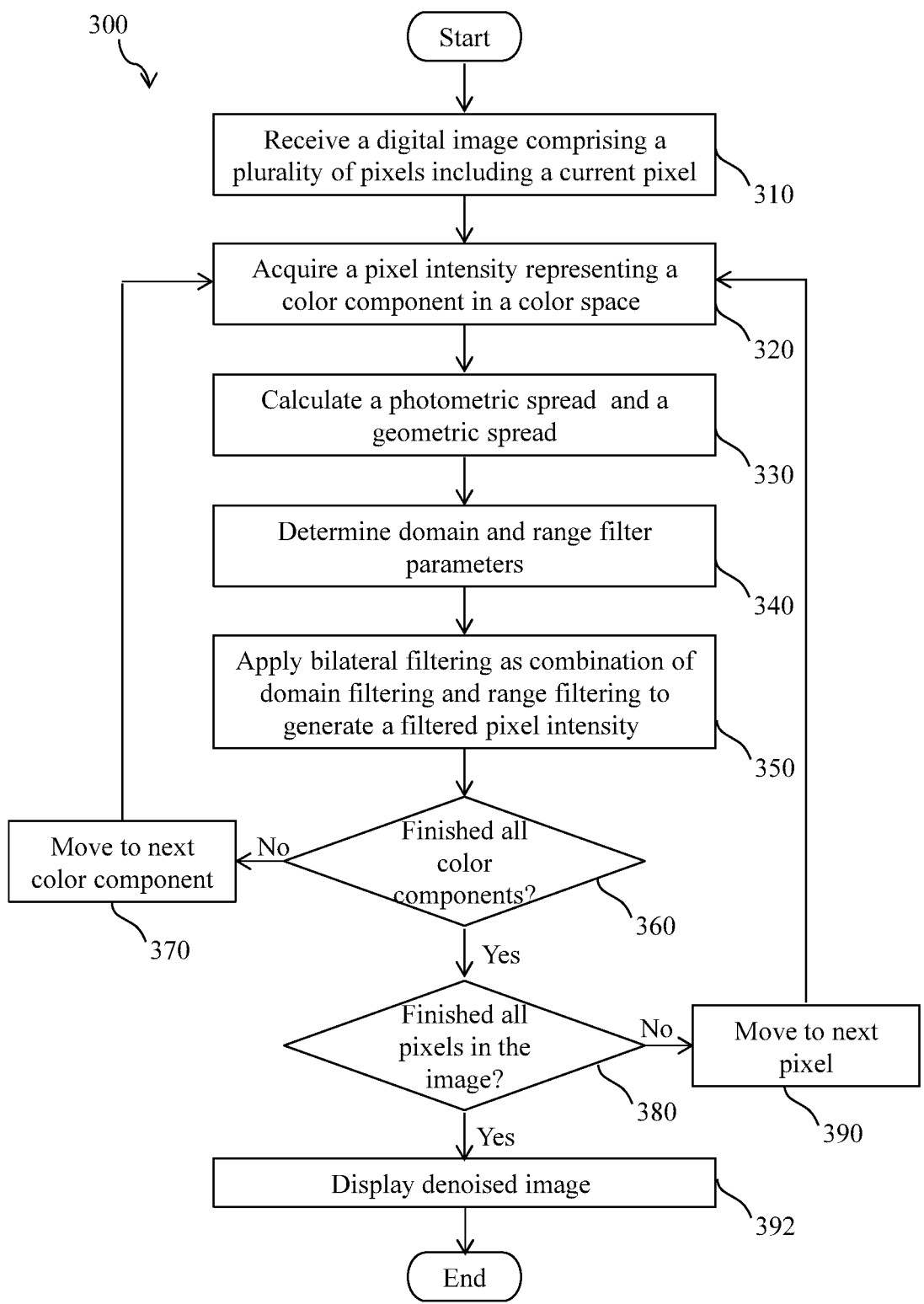
FIG. 3 is a flowchart of an embodiment of a method for implementing an adaptive bilateral filter.

FIG. 3 illustrates an embodiment of a method 300 for implementing an adaptive bilateral filter, e.g., inside a mobile device such as the mobile device 100. At block 310, a digital image comprising a plurality of pixels including a current pixel may be received. The digital image may be received locally from a memory or remotely from another device. The current pixel may be a center pixel to be filtered next. At block 320, a pixel intensity representing a color component in a color space (e.g., RGB or YUV) may be acquired by a processor. The intensity may be acquired via any suitable mechanism (e.g., measured or calculated). At block 330, a corresponding photometric spread ($\sigma_r$) and a corresponding geometric spread ($\sigma_d$) for the color component may be calculated. At block 340, a corresponding domain kernel ($s_a$) and a corresponding range kernel ($c_a$) may be calculated. Next at block 350, bilateral filtering may be applied on the current pixel as combination of the domain and range filtering to generate a filtered pixel intensity.

At block 360, the method 300 may determine whether all color components in the color space have been filtered. If the condition in block 360 is met, the method 300 may proceed to block 380. Otherwise, the method 300 may proceed to block 370 where processing may move to the next color component. Further, in block 380, the method 300 may determine whether all pixels in the digital image have been filtered. If the condition in block 380 is met, the method 300 may proceed to block 392. Otherwise, the method 300 may proceed to block 390, where the processing moves to the next pixel (e.g., a pixel next to the current pixel in the horizontal or vertical direction). After all digital image's pixels have been filtered, a denoised digital image may be output or displayed at block 392. It should be understood that method 300 serves for illustrative purposes, thus modification of steps, skipping of some steps, or addition of other steps are within scope of the present disclosure.

Figure 4:
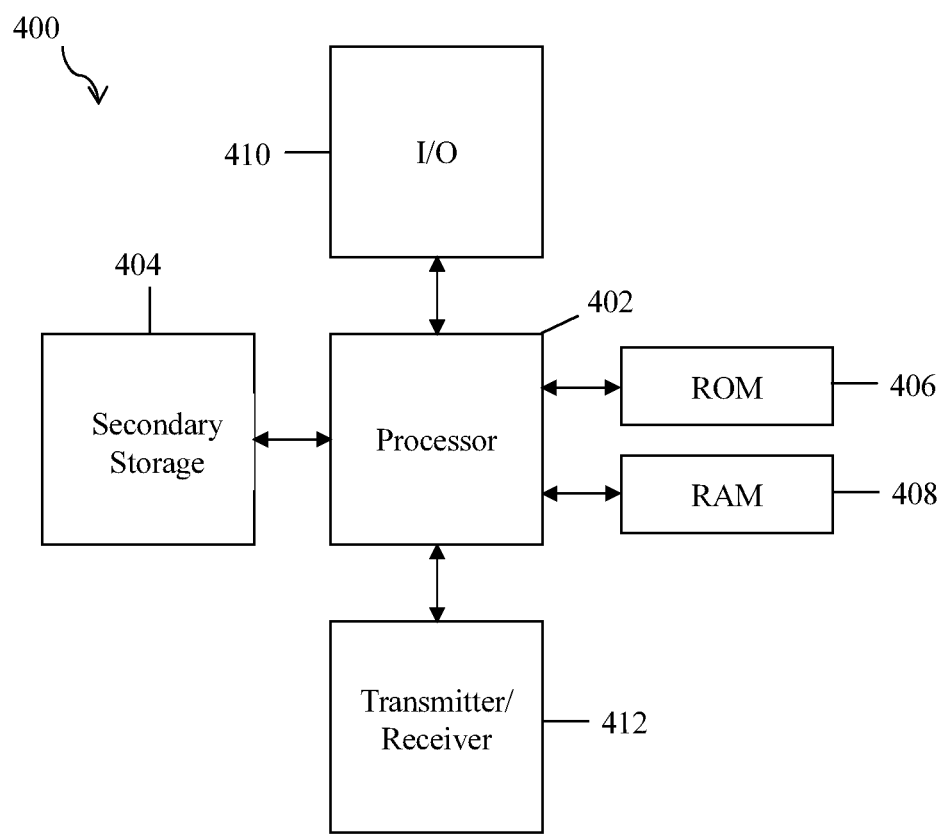
FIG. 4 is a schematic diagram of an embodiment of a computer system.

The schemes described above may be implemented on a network component, such as a computer or network component with sufficient processing power, memory resources, and network throughput capability to handle the necessary workload placed upon it. FIG. 4 illustrates an embodiment of a computer system or network node 400 suitable for implementing one or more embodiments of the systems disclosed herein, such as the mobile device 100 described above. The denoising filters disclosed herein may be implemented by other types of computer systems or electronic devices, such as a desktop computer or a server.

The computer system 400 includes a processor 402 that is in communication with memory devices including secondary storage 404, ROM 406, RAM 408, input/output (I/O) devices 410, and transmitter/receiver (transceiver) 412. Although illustrated as a single processor, the processor 402 is not so limited and may comprise multiple processors. The processor 402 may be implemented as one or more CPU chips, cores (e.g., a multi-core processor), field-programmable gate arrays (FPGAs), application specific integrated circuits (ASICs), and/or digital signal processors (DSPs). The processor 402 may be configured to implement at least part of any of the schemes or methods described herein, including the method 300. The processor 402 may be implemented using hardware or a combination of hardware and software.

The secondary storage 404 is typically comprised of one or more disk drives or tape drives and is used for non-volatile storage of data and as an over-flow data storage device if the RAM 408 is not large enough to hold all working data. The secondary storage 404 may be used to store programs that are loaded into the RAM 408 when such programs are selected for execution. The ROM 406 is used to store instructions and perhaps data that are read during program execution. The ROM 406 is a non-volatile memory device that typically has a small memory capacity relative to the larger memory capacity of the secondary storage 404. The RAM 408 is used to store volatile data and perhaps to store instructions. Access to both the ROM 406 and the RAM 408 is typically faster than to the secondary storage 404.

The transmitter/receiver 412 (sometimes referred to as a transceiver) may serve as an output and/or input (I/O) device of the computer system 400. For example, if the transmitter/receiver 412 is acting as a transmitter, it may transmit data out of the computer system 400. If the transmitter/receiver 412 is acting as a receiver, it may receive data into the computer system 400. Further, the transmitter/receiver 412 may include one or more optical transmitters, one or more optical receivers, one or more electrical transmitters, and/or one or more electrical receivers. The transmitter/receiver 412 may take the form of modems, modem banks, Ethernet cards, universal serial bus (USB) interface cards, serial interfaces, token ring cards, fiber distributed data interface (FDDI) cards, and/or other well-known network devices. The transmitter/receiver 412 may enable the processor 402 to communicate with an Internet or one or more intranets. The I/O devices 410 may be optional or may be detachable from the rest of the computer system 400. The I/O devices 410 may include a display such as a touch screen or a touch sensitive display. The I/O devices 410 may also include one or more keyboards, mice, or track balls, or other well-known input devices.

It is understood that by programming and/or loading executable instructions onto the computer system 400, at least one of the processor 402, the secondary storage 404, the RAM 408, and the ROM 406 are changed, transforming the computer system 400 in part into a particular machine or apparatus (e.g. a mobile device such as the mobile device 100 having the functionality taught by the present disclosure). The executable instructions may be stored on the secondary storage 404, the ROM 406, and/or the RAM 408 and loaded into the processor 402 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the mobile device 100) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising one or more processors configured to:
   receive a digital image comprising a current pixel and a plurality of nearby pixels;
   determine a pixel intensity of the current pixel, wherein the pixel intensity comprises a noise component; and
   reduce the noise component by applying a bilateral filter as a combination of a domain filter and a range filter on the current pixel, wherein the domain filter is dependent on the pixel intensity and geometric closeness between the current pixel and nearby pixels, wherein the range filter is dependent on the pixel intensity and photometric similarity between the current pixel and the nearby pixels, wherein the range filter is a first Gaussian filter having a photometric spread, and wherein the photometric spread is adapted based at least in part on the pixel intensity.

2. The apparatus of claim 1, further comprising one or more complementary metal-oxide semiconductor (CMOS) image sensors coupled to the one or more processors and configured to:
   generate the digital image under low-light conditions; and
   send the digital image to the one or more processors.

3. The apparatus of claim 2, wherein the apparatus is a smartphone comprising a digital camera coupled to the one or more processors, wherein the digital camera comprises the one or more CMOS image sensors, wherein the pixel intensity represents one color component in a red, green, and blue (RGB) color space, and wherein the one or more processors are further configured to:
   reduce noise components in pixel intensities representing the remaining two color components of the RGB color space; and
   combine three pixel intensities representing all color components of the RGB color space.

4. The apparatus of claim 1, wherein a number of the nearby pixels used in reducing the noise component is determined by a window size of the bilateral filter, and wherein the window size is adapted based on the pixel intensity.

5. The apparatus of claim 1, wherein the domain filter is a second Gaussian filter having a geometric spread, and wherein the geometric spread is adapted based at least in part on the pixel intensity.

6. The apparatus of claim 5, wherein the pixel intensity has a normalized value less than about 0.1, and wherein the geometric spread is determined as equal to about half of a window size of the domain filter.

7. The apparatus of claim 5, wherein the pixel intensity has a normalized value greater than about 0.9, and wherein the geometric spread is determined as about equal to a window size of the domain filter.

8. The apparatus of claim 5, wherein the pixel intensity has a normalized value, denoted as y(x), between about 0.1 and about 0.9, and wherein the geometric spread, denoted as $\sigma_d(y(x))$, is determined using the equation:

$$\sigma_d(y(x)) = \frac{w}{2}\left(1 + \frac{y(x) - 0.1}{0.9 - 0.1}\right),$$

where x is a location of the current pixel, and
w is a window size of the domain filter.

9. The apparatus of claim 1, wherein the pixel intensity has a normalized value denoted as y(x), and wherein the photometric spread, denoted as $\sigma_r(y(x))$, is determined using the equation:

$$\sigma_r(y(x)) = k_0 + k_1 y(x),$$

where x is a location of the current pixel,
$k_0$ is a positive scalar parameter dependent on image sensor characteristics, and
$k_1$ is another positive scalar parameter dependent on the image sensor characteristics.

10. The apparatus of claim 1, wherein the pixel intensity has a normalized value denoted as y(x), wherein applying the bilateral filter on the current pixel results in a filtered pixel intensity denoted as ŷ(x), and wherein the bilateral filter is represented by the following equations:

$$\hat{y}(x) = k^{-1}(x) \int\int_{-\infty}^{\infty} y(\xi) c(\xi, x) s(\xi, x) d\xi,$$

$$k(x) = \int\int_{-\infty}^{\infty} c(\xi, x) s(\xi, x) d\xi,$$

$$c(\xi, x) = e^{-\frac{1}{2}\left(\frac{\|\xi - x\|}{\sigma_d(y(x))}\right)^2},$$

$$s(\xi, x) = e^{-\frac{1}{2}\left(\frac{\|y(\xi) - y(x)\|}{\sigma_r(y(x))}\right)^2}, \text{ and}$$

$$\sigma_r(y(x)) = k_0 + k_1 y(x),$$

where x is a location of the current pixel,
ξ is a variable indicating locations of the nearby pixels,
$k^{-1}(x)$ is a normalization term,
c(ξ,x) is a Gaussian range kernel function,
s(ξ, x) is a Gaussian domain kernel function,
$\sigma_d(y(x))$ is a geometric spread,
$\sigma_r(y(x))$ is a photometric spread,
y(ξ) is a pixel intensity of a corresponding nearby pixel at location ξ,
$k_0$ is a positive scalar parameter dependent on image sensor characteristics, and
$k_1$ is another positive scalar parameter dependent on the image sensor characteristics.

11. The apparatus of claim 10, wherein the geometric spread, denoted as $\sigma_d(y(x))$, is determined using one of the following equations:

$$\sigma_d(y(x)) = \frac{w}{2}\left(1 + \frac{y(x) - 0.1}{0.9 - 0.1}\right)$$

for y(x) between about 0.1 and about 0.9, $$\sigma_d(y(x)) = \frac{w}{2} \text{ for } y(x) \text{ less than about } 0.1, \text{ and}$$

$$\sigma_d(y(x)) = w \text{ for } y(x) \text{ greater than about } 0.9.$$

where w is a window size of the domain filter.

12. A method for image filtering comprising:
receiving a digital image comprising a current pixel;
acquiring an intensity of the current pixel; and
filtering the acquired intensity of the current pixel to generate a filtered intensity, wherein filtering the acquired intensity comprises domain filtering and range filtering, both of which are based at least in part on the acquired intensity, wherein the range filter is a first Gaussian filter having a photometric spread, and wherein the photometric spread is adapted based at least in part on the acquired intensity.

13. The method of claim 12, further comprising:
generating the digital image using one or more complementary metal-oxide semiconductor (CMOS) image sensors under low-light conditions; and
sending the digital image from the one or more CMOS image sensors to one or more processors.

14. The method of claim 12, wherein the domain filtering comprises using a second Gaussian filter with a geometric spread, and wherein the geometric spread is adapted based at least in part on the acquired intensity.

15. The method of claim 14, wherein the acquired intensity has a normalized value, denoted as y(x), between about 0.1 and about 0.9, and wherein the geometric spread, denoted as $\sigma_d(y(x))$, is determined using the equation:

$$\sigma_d(y(x)) = \frac{w}{2}\left(1 + \frac{y(x) - 0.1}{0.9 - 0.1}\right),$$

where x is a location of the current pixel, and
w is a filter size of the domain filtering.

16. The method of claim 14, wherein the pixel intensity has a normalized value denoted as y(x), and wherein the photometric spread, denoted as $\sigma_r(y(x))$, is determined using the equation:

$$\sigma_r(y(x)) = k_0 + k_1 y(x),$$

where x is a location of the current pixel,
$k_0$ is a positive scalar parameter dependent on image sensor characteristics, and
$k_1$ is another positive scalar parameter dependent on the image sensor characteristics.

17. A computer program product comprising computer executable instructions stored on a non-transitory computer readable medium such that when executed by a processor cause a mobile electronic device to:
obtain a digital image comprising a plurality of pixels, wherein each pixel comprises a noise component that is dependent upon an intensity of the pixel;
denoise the digital image by adaptively applying a domain filter and a range filter on each pixel, wherein the adaptive application of the domain filter on a pixel in the digital image is based at least in part on the intensity of the pixel; and
display the denoised imaged on a display of the mobile electronic device wherein the range filter is a first Gaussian filter having a photometric spread, and wherein the photometric spread is adapted based at least in part on the pixel intensity.

18. The computer program product of claim 17, wherein the domain filter is a second Gaussian filter having a geometric spread, and wherein the geometric spread is adapted based at least in part on the pixel intensity.

19. The computer program product of claim 18, wherein the pixel intensity has a normalized value, denoted as y(x), between about 0.1 and about 0.9, and wherein the geometric spread, denoted as $\sigma_d(y(x))$, and the photometric spread, denoted as $\sigma_r(y(x))$, are determined using the equations:

$$\sigma_d(y(x)) = \frac{w}{2}\left(1 + \frac{y(x) - 0.1}{0.9 - 0.1}\right), \text{ and}$$

$$\sigma_r(y(x)) = k_0 + k_1 y(x),$$

where x is a location of the current pixel,
w is a window size of the domain filter,
$k_0$ is a positive scalar parameter dependent on image sensor characteristics, and
$k_1$ is another positive scalar parameter dependent on the image sensor characteristics.

\* \* \* \* \*